US012640413B2

(12) United States Patent
Cho

(10) Patent No.: US 12,640,413 B2
(45) Date of Patent: May 26, 2026

(54) METHOD AND DEVICE FOR DETECTING THERMAL RUNAWAY OF BATTERY PACK

(71) Applicant: SAMSUNG SDI CO., LTD., Yongin-si (KR)

(72) Inventor: Duckgu Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 423 days.

(21) Appl. No.: 18/200,695

(22) Filed: May 23, 2023

(65) Prior Publication Data

US 2024/0291057 A1 Aug. 29, 2024

(30) Foreign Application Priority Data

Feb. 24, 2023 (KR) ........................ 10-2023-0025399

(51) Int. Cl.
*H01M 10/48* (2006.01)
(52) U.S. Cl.
CPC ................................. *H01M 10/486* (2013.01)
(58) Field of Classification Search
CPC ....... H01M 10/486; H01M 2010/4271; H01M 2010/4278; H01M 10/613; H01M 10/425; H01M 10/482; H04Q 2209/823; Y02E 60/10; G01R 31/385; G01R 31/389; G01R 31/396; H04L 43/0811
See application file for complete search history.

(56) References Cited

U.S. PATENT DOCUMENTS

| | | | | |
|---|---|---|---|---|
| 10,658,714 | B2 * | 5/2020 | Grace ................. | H01M 10/488 |
| 11,881,572 | B1 * | 1/2024 | Jiang ................... | H01M 10/486 |
| 2014/0300364 | A1 * | 10/2014 | Choi ........................ | H04Q 9/00 |
| | | | | 324/426 |
| 2021/0190881 | A1 * | 6/2021 | Lee ...................... | H01M 10/633 |
| 2021/0218074 | A1 | 7/2021 | Aoki et al. | |
| 2021/0278468 | A1 | 9/2021 | Kojima et al. | |
| 2022/0013818 | A1 | 1/2022 | Chen et al. | |
| 2022/0181721 | A1 * | 6/2022 | Kwon ................... | H01M 10/66 |

(Continued)

FOREIGN PATENT DOCUMENTS

| | | |
|---|---|---|
| CN | 114223090 A | 3/2022 |
| CN | 114725577 A | 7/2022 |

(Continued)

OTHER PUBLICATIONS

Extended European Search Report dated May 28, 2024, for corresponding European Patent Application No. 23176561.1.

(Continued)

*Primary Examiner* — Manuel A Rivera Vargas
(74) *Attorney, Agent, or Firm* — Lee IP Law, P.C.

(57) ABSTRACT

A method for detecting thermal runaway of a battery pack including a battery module in a master battery management system, the method comprising detecting a communication error with a slave battery management system that detects information on the battery module, if the communication error with the slave battery management system is detected, obtaining temperature of a master board from a temperature sensor located on the master board in which the master battery management system is installed, and detecting thermal runaway of the battery pack using the temperature of the master board.

16 Claims, 4 Drawing Sheets

(56)          References Cited

U.S. PATENT DOCUMENTS

2022/0328890  A1      10/2022  Aoki et al.
2022/0336921  A1 *   10/2022  Zhou ................... H01M 10/443
2022/0359922  A1      11/2022  Park
2022/0367941  A1 *   11/2022  Lee ..................... H01M 10/627
2023/0318066  A1 *   10/2023  Williams ............. H01M 10/63
                                                                    429/53
2024/0079667  A1 *   3/2024   Kim ................... H01M 10/486
2024/0269593  A1 *   8/2024   Junginger ........... H01M 10/635
2025/0189590  A1 *   6/2025   Schmidt ............... G01R 31/378
2025/0260079  A1 *   8/2025   Chen ................... B60L 3/0046

FOREIGN PATENT DOCUMENTS

CN            114976310  A      8/2022
JP          2018-206524  A     12/2018
KR           10-2332444  B1    11/2021
KR      10-2022-0097962  A      7/2022

OTHER PUBLICATIONS

EPO Office Communication dated Apr. 25, 2025, for corresponding European Patent Application No. 23176561.1, which includes observations filed by a third party on Apr. 18, 2025.

* cited by examiner

METHOD AND DEVICE FOR DETECTING THERMAL RUNAWAY OF BATTERY PACK

CROSS-REFERENCE TO RELATED APPLICATION

Korean Patent Application No. 10-2023-0025399, filed in the Korean Intellectual Property Office on Feb. 24, 2023, is incorporated by reference herein in its entirety.

BACKGROUND

1. Field

A method and apparatus for detecting thermal runaway of a battery pack is disclosed.

2. Description of the Related Art

In general, thermal runaway of a battery system is detected as a combination of a voltage drop of the battery cell, a maximum temperature of the battery cell, and a temperature increase rate of the battery cell.

SUMMARY

Embodiments are directed to a method for detecting thermal runaway of a battery pack including a battery module in a master battery management system, the method including detecting a communication error with a slave battery management system that detects information on the battery module, if the communication error with the slave battery management system is detected, obtaining temperature of a master board from a temperature sensor located on the master board in which the master battery management system is installed, and detecting thermal runaway of the battery pack using the temperature of the master board.

The detecting the communication error with the slave battery management system includes checking whether information on the battery module is received from the slave battery management system, and determining that the communication error with the slave battery management system has occurred if the information on the battery module is not received within a set time.

The method further includes detecting the thermal runaway using the information on the battery module if information on the battery module is received from the battery management system, wherein the information on the battery module includes voltage and temperature.

The detecting of the thermal runaway of the battery pack includes determining that the thermal runaway has occurred if the temperature of the master board exceeds a predetermined threshold.

The predetermined threshold is 60 degrees Celsius.

The method further includes detecting the thermal runaway using a temperature of a battery coolant.

The master battery management system and the slave battery management system are wired or wirelessly connected.

Embodiments are directed to an apparatus for detecting thermal runaway of a battery pack including a battery module, including a master board temperature obtainer that obtains a temperature of a master board in which a master battery management system is installed or a temperature of a battery coolant, and a controller that checks whether information on the battery module is received from a slave battery management system, and detects thermal runaway of the battery pack using the temperature of the master board or the temperature of the battery coolant if the information on the battery module is not received within a set time.

The controller determines that the communication error with the slave battery management system has occurred if the information on the battery module is not received within the set time.

The controller determines that the thermal runaway has occurred if the temperature of the master board exceeds a predetermined threshold.

The controller determines that the thermal runaway has occurred if the temperature of the battery coolant exceeds a predetermined threshold.

The temperature of the battery coolant includes a temperature of the battery coolant at an inlet location of a battery cooling line through which the battery coolant is circulated and a temperature of the battery coolant at an outlet location of the battery cooling line, and the controller detects the thermal runaway based on a difference between the temperature of the battery coolant at the inlet location and the temperature of the battery coolant at the outlet location.

The apparatus for detecting thermal runaway is implemented in the master battery management system.

The controller of the thermal runaway detection apparatus detects thermal runaway of the battery pack using information on the battery module if the information on the battery module is received within the set time.

The difference between the temperature of the battery coolant at the inlet location and the temperature of the battery coolant at the outlet location is compared to a battery coolant predetermined threshold to determine the thermal runaway.

The battery coolant predetermined threshold is about 30 to 40 degrees Celsius.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
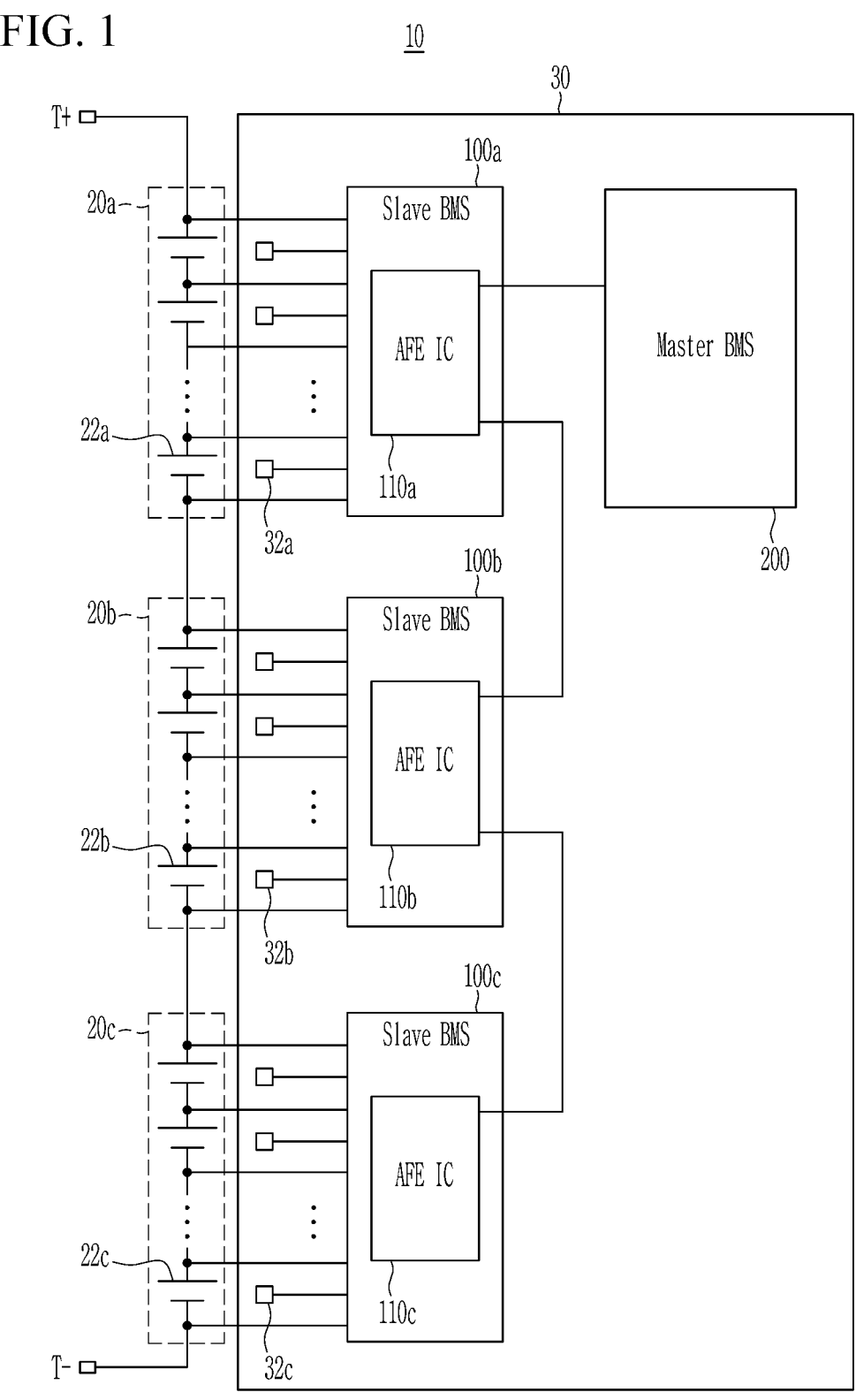
FIG. 1 is a diagram of a battery pack including a battery management device showing an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In the flowchart described with reference to the drawings in this specification, the order of operations may be changed, several operations may be merged, some operations may be divided, and specific operations may not be performed.

Throughout the specification and claims, when a part is referred to "include" a certain element, it means that it may further include other elements rather than exclude other elements, unless specifically indicated otherwise.

In addition, expressions described in the singular may be interpreted in the singular or plural unless explicit expressions such as "one" or "single" are used.

In addition, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may be referred to as a first element.

Furthermore, when a component is referred to be "connected" with another component, it includes not only the case where two components are "directly connected" but also the case where two components are "indirectly or non-contactedly connected" with another component interposed therebetween, or the case where two components are "electrically connected." On the other hand, when an element is referred to as "directly connected" to another element, it should be understood that no other element exists in the middle.

FIG. 1 is a diagram of a battery pack including a battery management device showing an example embodiment. Referring to FIG. 1, the battery pack 10 may be mounted in various power devices that use electrical energy stored in the battery pack 10, such as an electric vehicle. The battery pack 10 may include a plurality of battery modules 20a, 20b, and 20c connected in series with each other and the wireless battery management device 30.

The plurality of battery modules 20a, 20b, and 20c connected in series to each other may be connected to an external charging device or load through system terminals T and T−, and may be charged by the charging device or discharged by the load.

The battery module 20a may include a plurality of battery cells 22a electrically connected to each other in series and/or parallel. The battery module 20b may include a plurality of battery cells 22b electrically connected to each other in series and/or parallel. The battery module 20c may include a plurality of battery cells 22c electrically connected to each other in series and/or parallel.

The battery management device 30 monitors the voltage, current, and temperature of the battery modules 20a, 20b, and 20c to maintain the battery modules 20a, 20b, and 20c in optimal conditions. The battery management device 30 may include a plurality of slave battery management systems (BMS) 100a, 100b, and 100c and a master BMS 200. Hereinafter, for convenience of explanation, as shown in FIG. 1, it will be described that the battery pack 10 includes three battery modules 20a, 20b, and 20c, and the battery management device 30 includes three slave BMSs 100a, 100b, and 100c.

The plurality of slave BMSs 100a, 100b, and 100c may be installed to correspond to the plurality of battery modules 20a, 20b, and 20c included in the battery pack 10 on a one-to-one basis. Each of the plurality of slave BMSs 100a, 100b, and 100c may be electrically connected to any one battery module 20a, 20b, and 20c in which it is installed among the plurality of battery modules 20a, 20b, and 20c. In an implementation, the slave BMS 100a may be electrically connected to the battery module 20a, the slave BMS 100b may be electrically connected to the battery module 20b, and the slave BMS 100c may be electrically connected to the battery module 20c.

The plurality of slave BMSs 100a, 100b, and 100c may include analog front end (AFE) integrated circuits (ICs) 110a, 110b, and 110c, respectively. The AFE ICs 110a, 110b, and 110c included in each of the plurality of slave BMSs 100a, 100b, and 100c may detect the overall state (e.g., voltage, current, and temperature) of the battery modules 20a, 20b, and 20c electrically connected thereto, and perform various control functions (e.g., charging, discharging, balancing) for adjusting the state of the battery modules 20a, 20b, and 20c. At this time, each control function may be performed by each slave BMS 100a, 100b, and 100c directly based on the state of the battery modules 20a, 20b, and 20c or may be performed according to a command from the master BMS 200. As used herein, the term "or" is not an exclusive term, e.g., "A or B" would include A, B, or A and B.

The AFE IC 110a included in the slave BMS 100a may be electrically connected to at least one temperature sensor 32a. The AFE IC 110b included in the slave BMS 100b may be electrically connected to at least one temperature sensor 32b. The AFE IC 110c included in the slave BMS 100c may be electrically connected to at least one temperature sensor 32c. The at least one temperature sensor 32a may detect the temperature of the cells 22a constituting the battery module 20a. The at least one temperature sensor 32b may detect the temperature of the cells 22b constituting the battery module 20b. The at least one temperature sensor 32c may detect the temperature of the cells 22c constituting the battery module 20c.

In addition, the AFE IC 110a included in the slave BMS 100a may be electrically connected to both ends of the battery module 20a, and may detect the voltage value of the battery module 20a. The AFE IC 110b included in the slave BMS 100b may be electrically connected to both ends of the battery module 20b, and may detect the voltage value of the battery module 20b. The AFE IC 110c included in the slave BMS 100c may be electrically connected to both ends of the battery module 20c, and may detect the voltage value of the battery module 20c. Furthermore, the AFE IC 110a included in the slave BMS 100a may be electrically connected to both ends of each cell 22a constituting the battery modules 20a, and may detect the cell voltage of each cell 22a. The AFE IC 110b included in the slave BMS 100b may be electrically connected to both ends of each cell 22b constituting the battery modules 20b, and may detect the cell voltage of each cell 22b. The AFE IC 110c included in the slave BMS 100c may be electrically connected to both ends of each cell 22c constituting the battery modules 20c, and may detect the cell voltage of each cell 22c.

The master BMS 200 receives information on the battery modules 20a, 20b, and 20c from the plurality of slave BMSs 100a, 100b, and 100c, and performs control functions such as state of charge (SOC), power control, cell balancing control, fault diagnosis control, and cooling control and thermal runaway detection control. In addition, the master BMS 200 may control a relay for supplying and blocking the power of the battery modules 20a, 20b, and 20c to the load based on the information of the battery modules 20a, 20b, and 20c.

The master BMS 200 may be connected to a plurality of slave BMSs 100a, 100b, and 100c through wired communication lines. The plurality of slave BMSs 100a, 100b, and 100c may be connected in a daisy chain manner. Accordingly, the master BMS 200 may be connected to one slave BMS 100a at the top among the plurality of slave BMSs 100a, 100b, and 100c through a wired communication line. The master BMS 200 may transmit control information to the one slave BMS 100a. The one slave BMS 100a at the top transfers the control information received from the master BMS 200 to the slave BMS 100b at the lower, and the slave BMS 100b also transfers the received control information to the slave BMS 100c at the lower. The plurality of slave BMSs 100a, 100b, and 100c respectively detect information about the connected battery modules 20a, 20b, and 20c in response to the control information. The slave BMS 100c at the lowest transfers the detected information to the slave BMS 100b at the upper, and the slave BMS 100b transfers the detected information and the information received from the slave BMS 100c to the slave BMS100a at the upper, and the slave BMS 100a may deliver the detected information and the information received from the slave BMSs 100b and 100c to the master BMS 200.

Alternatively, the master BMS 200 may be connected to a plurality of slave BMSs 100a, 100b, and 100c using a wireless network as a connection method.

The master BMS 200 may obtain information on the battery modules 20a, 20b, and 20c including the voltages, currents, and temperatures of the battery modules 20a, 20b, and 20c detected by the plurality of slave BMSs 100a, 100b, and 100c, periodically.

The master BMS 200 may detect thermal runaway of the battery pack 10 using voltages and temperatures of the battery modules 20a, 20b, and 20c. Thermal runaway of the battery pack 10 may include thermal runaway of the battery modules 20a, 20b, and 20c.

On the other hand, due to thermal runaway of the battery modules 20a, 20b, and 20c or other reasons, damage to the communication line between the master BMS 200 and the slave BMS 100a, damage to the communication line between the slave BMSs 100a, 100b, and 100c, damage to the AFE IC of the slave BMSs 100a, 100b, and 100c may occur. In this case, since the master BMS 200 cannot obtain information on the battery modules 20a, 20b, and 20c including the voltages, currents, and temperatures of the battery modules 20a, 20b, and 20c, even if thermal runaway occurs, it cannot be detected.

If the master BMS 200 does not obtain information on the battery modules 20a, 20b, and 20c from the slave BMS 100a, 100b, and 100c within a set time, the master BMS 200 may detect thermal runaway of the battery pack 10 based on the temperature of the master board where the master BMS 200 is located. In addition, the master BMS 200 may detect thermal runaway based on the temperature of the battery coolant.

Figure 2:
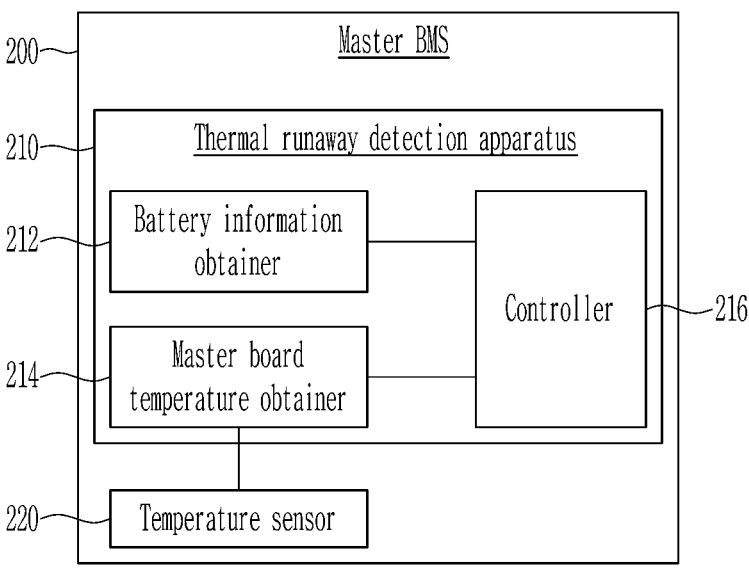
FIG. 2 is a diagram of a thermal runaway detection apparatus showing an example embodiment.

FIG. 2 is a diagram of a thermal runaway detection apparatus showing an example embodiment. Referring to FIG. 2, the master BMS 200 may include a thermal runaway detection apparatus 210 and a temperature sensor 220.

The temperature sensor 220 may be used to check the normal operation of the master board in which the master BMS 200 is installed, and may be located in the master board. The temperature sensor 220 may detect the temperature of the master board. The temperature sensor 220 may transmit the detected temperature of the master board to the thermal runaway detection apparatus 210.

The thermal runaway detection apparatus 210 may include a battery information obtainer 212, a master board temperature obtainer 214, and a controller 216.

The battery information obtainer 212 may obtain information on the battery modules 20a, 20b, and 20c including the voltages, currents, and temperatures of the battery modules 20a, 20b, and 20c detected by the plurality of slave BMSs 100a, 100b, and 100c, periodically, and transmit information on the battery modules 20a, 20b, and 20c to the controller 216.

The master board temperature obtainer 214 may obtain the temperature of the master board detected by the temperature sensor 220 and transmit the temperature of the master board to the controller 216.

The controller 216 may detect thermal runaway of the battery pack 10 based on periodically obtained information of the battery modules 20a, 20b, and 20c.

The controller 216 may not be able to obtain information on the battery modules 20a, 20b, and 20c due to a communication error with the slave BMSs 100a, 100b, and 100c. When the information of the battery modules 20a, 20b, and 20c cannot be obtained, the controller 216 may detect thermal runaway of the battery pack 10 based on the temperature of the master board obtained through the master board temperature obtainer 214.

The temperature of the master board detected by the temperature sensor 220 may vary depending on various factors such as workload of the master BMS 200 or the surrounding temperature. In an implementation, when thermal runaway of the battery pack 10 occurs, the temperature of the master board may increase due to the temperature of the battery pack 10. Accordingly, if the information of the battery modules 20a, 20b, and 20c cannot be obtained, the controller 216 may detect thermal runaway of the battery pack 10 by using the temperature of the master board detected by the temperature sensor 220. The controller 216 may determine that thermal runaway of the battery pack 10 has occurred if the temperature of the master board exceeds a predetermined threshold. A threshold value for comparison with the temperature of the master board may be set to 60 degrees. The threshold value for comparison with the temperature of the master board may be set to 60 degrees Celsius.

In this way, the thermal runaway detection apparatus 210 uses the temperature sensor 220 located on the master board for detecting thermal runaway, thereby detecting thermal runaway of the battery pack 10 without additional cost when communication errors with the slave BMSs 100a, 100b, and 100c occur.

Figure 3:
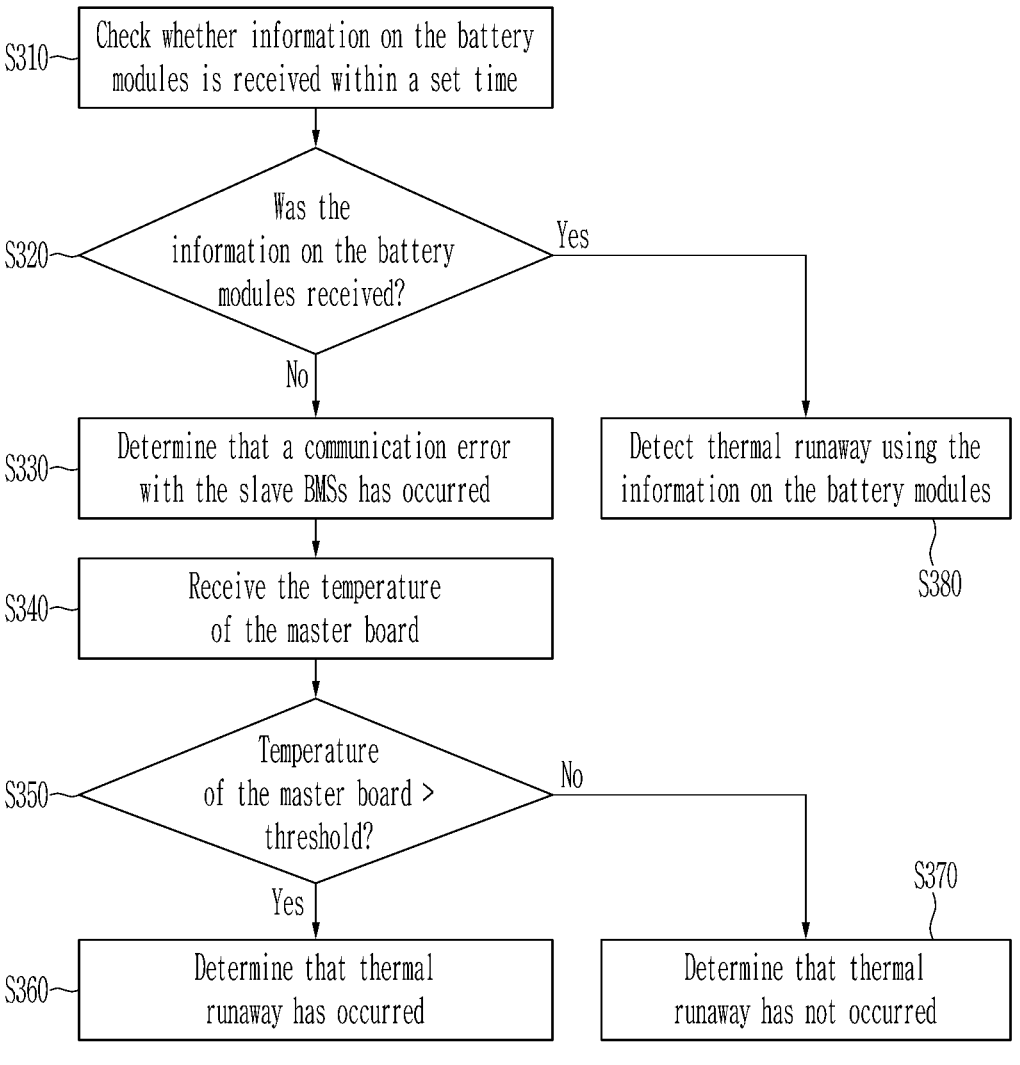
FIG. 3 is a flowchart of an example embodiment showing steps in a method for detecting a thermal runaway.

FIG. 3 is a flowchart of an example embodiment showing steps in a method for detecting a thermal runaway. Referring to FIG. 3, the controller 216 of the thermal runaway detection apparatus 210 checks whether information on the battery modules 20a, 20b, and 20c is received within a set time (S310).

When information on the battery modules 20a, 20b, and 20c is not received within the set time (S320), the controller 216 of the thermal runaway detection apparatus 210 determines that a communication error with the slave BMSs 100a, 100b, and 100c has occurred (S330). The set time may be set to, e.g., 1 second, 2 seconds, or 3 seconds. The slave BMSs 100a, 100b, and 100c may transmit information on the battery modules 20a, 20b, and 20c to the master BMS 200 at set intervals (e.g., 100 milliseconds). The controller 216 may determine that a communication error with the slave BMSs 100a, 100b, and 100c has occurred if information on the battery modules 20a, 20b, and 20c is not received for a set time (e.g., 1 second).

If a communication error occurs with the slave BMSs 100a, 100b, and 100c, the controller 216 of the thermal runaway detection apparatus 210 receives the temperature of the master board through the master board temperature obtainer 214 (S340).

The controller 216 of the thermal runaway detection apparatus 210 may detect thermal runaway of the battery pack 10 based on the temperature of the master board. If the temperature of the master board exceeds the threshold (S350), the controller 216 of the thermal runaway detection apparatus 210 may determine that thermal runaway has occurred (S360). If the temperature of the master board is less than or equal to the threshold (S350), the controller 216 of the thermal runaway detection apparatus 210 may determine that thermal runaway has not occurred (S370).

As such, according to one embodiment, if the information of the battery modules 20a, 20b, and 20c cannot be obtained due to a communication error with the slave BMSs 100a, 100b, and 100c, the controller 216 of the thermal runaway detection apparatus 210 may detect thermal runaway of the battery pack 10 using the temperature of the master board.

Meanwhile, if information on the battery modules 20a, 20b, and 20c is received within a set time, the controller 216 of the thermal runaway detection apparatus 210 may detect thermal runaway of the battery pack 10 using the voltage and temperature information of the battery modules 20a, 20b, and 20c (S380).

Figure 4:
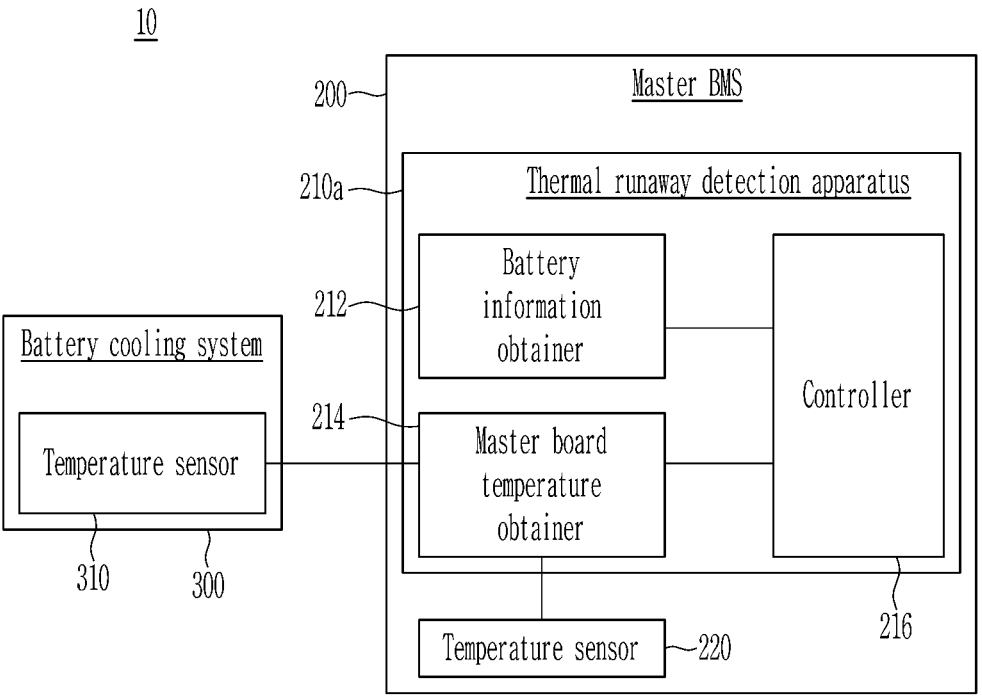
FIG. 4 is a diagram of a thermal runaway detection apparatus showing an example embodiment.

FIG. 4 is a diagram of a thermal runaway detection apparatus showing an example embodiment. Referring to FIG. 4, the battery pack 10 may include various temperature sensors in addition to the temperature sensor 220 located in the master board. The temperature detected by at least some of the various temperature sensors may vary depending on whether thermal runaway of the battery pack 10 has occurred.

In an implementation, the battery pack 10 may include a battery cooling system 300 to prevent overheating of the battery modules 20a, 20b, and 20c. The battery cooling system 300 may include battery cooling line installed below the battery modules 20a, 20b, and 20c or between the battery modules 20a, 20b, and 20c to circulate battery coolant. In addition, the battery cooling system 300 may further include at least one temperature sensor 310 for measuring the temperature of the battery coolant. As an example, temperature sensors 310 may be mounted at the inlet of the battery cooling line and at the outlet of the battery cooling line.

The at least one temperature sensor 310 may detect the temperature of the battery coolant. When the temperature sensors 310 are mounted at the inlet of the battery cooling line and the outlet of the battery cooling line, respectively, each temperature sensor 310 may detect the temperature of the battery coolant at the corresponding location of the battery cooling line.

When thermal runaway of the battery pack 10 occurs, the temperature of the battery coolant may also increase. The master board temperature obtainer 214 of the thermal runaway detection apparatus 210a may obtain the temperature of the battery coolant.

The controller 216 of the thermal runaway detecting apparatus 210a may detect thermal runaway by using the temperature of the battery coolant. The controller 216 of the thermal runaway detection apparatus 210a may detect that thermal runaway has occurred if the temperature of the battery coolant exceeds a predetermined threshold. The predetermined threshold for comparison with the temperature of the battery coolant may be set to 30 degrees to 40 degrees. In other words, the predetermined threshold for comparison with the temperature of the battery coolant may be set to about 30 degrees to 40 degrees Celsius.

The controller 216 of the thermal runaway detection apparatus 210a may detect thermal runaway of the battery pack 10 based on a difference between the temperature detected at the inlet of the battery cooling line and the temperature detected at the outlet of the battery cooling line. The controller 216 may determine that thermal runaway has occurred if the difference between the temperature detected at the inlet of the battery cooling line and the temperature detected at the outlet of the battery cooling line is equal to or greater than a predetermined temperature difference.

As such, the thermal runaway detection apparatus 210a may detect thermal runaway of the battery pack 10 using the temperature of the battery coolant when a communication error occurs with the slave BMSs 100a, 100b, and 100c.

The thermal runaway detection apparatuses 210 and 210a may represent computing device in which the above-described thermal runaway detection method is implemented. The thermal runaway detection apparatuses 210 and 210a may include at least one processor. At least one processor may be implemented as various types such as an application processor (AP), a central processing unit (CPU), a graphics processing unit (GPU), and the like. At least one processor stores program commands for implementing at least some functions of the battery information obtainer 212, the master board temperature obtainer 214, and the controller 216 described in FIGS. 2 and 4 in a memory, and may perform the thermal runaway detection operation by executing program commands stored in the memory.

According to at least one of the embodiments, thermal runaway may be detected even when the voltage and temperature of the battery cell cannot be obtained due to damage to the AFE IC or damage to a communication line with the AFE IC.

According to at least one embodiment of the embodiments, thermal runaway may be detected using a temperature sensor located on the master board without a pressure sensor or gas sensor.

By way of summation and review, thermal runaway may be detected using 'voltage drop and temperature rise rate of battery cell' or 'maximum temperature and temperature rise rate of battery cell'. These detection methods have no problem when voltage and temperature are normally measured. However, if the analog front end (AFE) integrated circuit (IC) that measures the voltage and temperature is damaged or the communication line with the AFE IC is damaged, the voltage and temperature cannot be measured or voltage and temperature measured by the AFE IC cannot be obtained. In this case, thermal runaway detection is difficult. At least one of the embodiments is to provide a method and apparatus for detecting thermal runaway of a battery pack capable of detecting thermal runaway even when voltage and temperature of a battery cell cannot be obtained.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for detecting thermal runaway of a battery pack including a battery module in a master battery management system, the method comprising:

detecting a communication error with a slave battery management system that detects information on the battery module;

obtaining, in response to detecting the communication error, a temperature of a master board from a temperature sensor located on the master board in which the master battery management system is installed; and detecting thermal runaway of the battery pack using the temperature of the master board.

2. The method as claimed in claim 1, wherein the detecting the communication error with the slave battery management system includes:

checking whether information on the battery module is received from the slave battery management system; and determining that the communication error with the slave battery management system has occurred if the information on the battery module is not received within a set time.

3. The method as claimed in claim 2, further comprising detecting the thermal runaway using the information on the battery module if information on the battery module is received from the battery management system, wherein the information on the battery module includes voltage and temperature.

4. The method as claimed in claim 1, wherein the detecting of the thermal runaway of the battery pack includes determining that the thermal runaway has occurred if the temperature of the master board exceeds a predetermined threshold.

5. The method as claimed in claim 1, wherein the master battery management system and the slave battery management system are wired or wirelessly connected.

6. The method as claimed in claim 1, further comprising detecting the thermal runaway using a temperature of a battery coolant.

7. An apparatus for detecting thermal runaway of a battery pack including a battery module, comprising:

a master board temperature obtainer that obtains a temperature of a master board in which a master battery management system is installed or a temperature of a battery coolant; and a controller that determines a communication error based on a communication connection with a slave battery management system, and detects thermal runaway of the battery pack using the temperature of the master board or the temperature of the battery coolant in response to determining the communication error.

8. The apparatus as claimed in claim 7, wherein the controller determines that the thermal runaway has occurred if the temperature of the master board exceeds a predetermined threshold.

9. The apparatus as claimed in claim 8, wherein the predetermined threshold is 60 degrees Celsius.

10. The apparatus as claimed in claim 7, wherein the controller determines that the thermal runaway has occurred if the temperature of the battery coolant exceeds a predetermined threshold.

11. The apparatus as claimed in claim 10, wherein the predetermined threshold is about 30 to 40 degrees Celsius.

12. The apparatus as claimed in claim 7, wherein:

the temperature of the battery coolant includes a temperature of the battery coolant at an inlet location of a battery cooling line through which the battery coolant is circulated and a temperature of the battery coolant at an outlet location of the battery cooling line, and the controller detects the thermal runaway based on a difference between the temperature of the battery coolant at the inlet location and the temperature of the battery coolant at the outlet location.

13. The apparatus as claimed in claim 12, wherein the difference between the temperature of the battery coolant at the inlet location and the temperature of the battery coolant at the outlet location is compared to a battery coolant predetermined threshold to determine the thermal runaway.

14. The apparatus as claimed in claim 7, wherein the controller determines that the communication error with the slave battery management system has occurred if the information on the battery module is not received within a set time.

15. The apparatus as claimed in claim 7, wherein the apparatus for detecting thermal runaway is implemented in the master battery management system.

16. The apparatus as claimed in claim 7, wherein the controller of the thermal runaway detection apparatus detects thermal runaway of the battery pack using information on the battery module if the information on the battery module is received within the set time.

* * * * *